United States Patent
Yoo et al.

(10) Patent No.: US 11,468,328 B2
(45) Date of Patent: Oct. 11, 2022

(54) MANAGING INFORMATION TRANSMISSION FOR WIRELESS COMMUNICATION

(71) Applicant: QUALCOMM Incorporated, San Diego, CA (US)

(72) Inventors: Taesang Yoo, San Diego, CA (US); Naga Bhushan, San Diego, CA (US); Pavan Kumar Vitthaladevuni, San Diego, CA (US); Tingfang Ji, San Diego, CA (US); Krishna Kiran Mukkavilli, San Diego, CA (US); Jay Kumar Sundararajan, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 16/911,713

(22) Filed: Jun. 25, 2020

(65) Prior Publication Data

US 2021/0264254 A1   Aug. 26, 2021

Related U.S. Application Data

(60) Provisional application No. 62/980,804, filed on Feb. 24, 2020.

(51) Int. Cl.
*G06N 3/08*     (2006.01)
*H04W 88/06*    (2009.01)

(52) U.S. Cl.
CPC .............. *G06N 3/08* (2013.01); *H04W 88/06* (2013.01)

(58) Field of Classification Search
CPC ........ G06N 3/08; G06N 3/088; G06N 3/0454; H04W 88/06; H04W 12/03; H04W 80/02
See application file for complete search history.

(56) References Cited

U.S. PATENT DOCUMENTS

| 9,805,371 B1 | 10/2017 | Sapoznik et al. |
| 10,217,047 B2 | 2/2019 | O'Shea |

(Continued)

FOREIGN PATENT DOCUMENTS

WO   2018184682 A1   10/2018

OTHER PUBLICATIONS

International Search Report and Written Opinion—PCT/US2021/018675—ISA/EPO—dated Jun. 1, 2021, 14 pages.

(Continued)

*Primary Examiner* — Hashim S Bhatti
(74) *Attorney, Agent, or Firm* — Yanling Yang

(57) ABSTRACT

Embodiments include methods for managing information transmission between a base station and a wireless device. A base station may apply an encoder neural network to assistance information that may aid a wireless device in communicating with the base station to generate encoded assistance information. The base station may transmit the encoded assistance information to the wireless device via a control or data channel. The wireless device may use the encoded assistance information to update one or more behaviors of the wireless device without decoding the encoded assistance information. The wireless device may include a different neural network configured to learn how to use the encoded assistance information to update one or more behaviors of the wireless device.

39 Claims, 10 Drawing Sheets

(56) References Cited

U.S. PATENT DOCUMENTS

| | | | |
|---|---|---|---|
| 10,429,486 B1* | 10/2019 | O'Shea | G01S 5/0268 |
| 2018/0332041 A1* | 11/2018 | Fan | H04W 12/35 |
| 2019/0171929 A1* | 6/2019 | Abadi | G06N 3/084 |
| 2020/0366537 A1* | 11/2020 | Wang | H04L 25/0224 |
| 2021/0049451 A1* | 2/2021 | Wang | G06N 3/0454 |
| 2021/0279584 A1* | 9/2021 | Xu | G06F 17/16 |

OTHER PUBLICATIONS

Challita U., et al., "When Machine Learning Meets Wireless Cellular Networks: Deployment, Challenges, and Applications", Ericsson Research, Stockholm, Sweden, 7 Pages.

* cited by examiner

US 11,468,328 B2

MANAGING INFORMATION TRANSMISSION FOR WIRELESS COMMUNICATION

RELATED APPLICATIONS

This application claims the benefit of priority to U.S. Provisional Application No. 62/980,804 entitled "Managing Information Transmission For Wireless Communication" filed Feb. 24, 2020, the entire contents of which are hereby incorporated by reference for all purposes.

BACKGROUND

In some modem implementations in wireless devices, the wireless device can achieve improvements in wireless communication performance, handle more complex information, and reap power savings by determining or receiving information about algorithms used by a base station, or internal states of the base station. For example, with more detailed knowledge of aspects of a scheduler of the base station, the wireless device may determine better channel state feedback, improving the efficiency and accuracy of wireless communications with the base station. However, such information about the base station may be too large to deliver quickly and efficiently to the wireless device. Further, this information may include proprietary or secret information that the provider of the base station does not desire to reveal in a form that is easily discoverable.

SUMMARY

Various aspects include systems and methods of wireless communications performed by a processor of a base station. Various aspects may include applying an encoder neural network to assistance information in the base station to generate encoded assistance information, and transmitting the encoded assistance information to a wireless device. In some aspects, the encoder neural network may include the encoder portion of an autoencoder neural network, although a corresponding decoder neural network is not provided to the wireless device. In some aspects, transmitting the encoded assistance information to the wireless device may include transmitting the encoded assistance information to the wireless device via a control channel or a data channel. In some aspects, the encoded assistance information may be in a form that the wireless device cannot process to recover the assistance information in the base station. In some aspects, the assistance information in the base station may include algorithms or information about an internal state of the base station. Some aspects may further include training the encoder neural network and a decoder neural network on a data set of the assistance information using an unsupervised training method, using the trained encoder neural network to generate the encoded assistance information, and not sharing the decoder neural network with wireless devices.

Further aspects may include a computing device for use in a base station of a wireless communication system and having a processor configured with processor-executable instructions to perform operations of any of the methods summarized above. Further aspects may include a non-transitory processor-readable storage medium having stored thereon processor-executable instructions configured to cause a computing device of a base station to perform operations of any of the methods summarized above. Further aspects include a base station having means for performing functions of any of the methods summarized above.

Various aspects include methods of wireless communications performed by a processor of a wireless device. Various aspects may include receiving encoded assistance information from a base station, and using the encoded assistance information to update one or more behaviors of the wireless device. In some aspects, using the encoded assistance information to update one or more behaviors of the wireless device may include providing the received encoded assistance information as an input to a wireless device processing block and updating one or more behaviors of the wireless device based on the encoded assistance information. In some aspects, receiving the encoded assistance information may include receiving the encoded assistance information via a control or a data channel.

In some aspects, using the encoded assistance information may include using the encoded assistance information as an input to a self-learning neural network. In some aspects, the self-learning neural network may be trained via one of supervised learning or reinforcement learning to optimize a cost or performance metric. In various aspects, the wireless device is not configured to decode the encoded assistance information.

Further aspects may include a wireless device having a processor configured to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
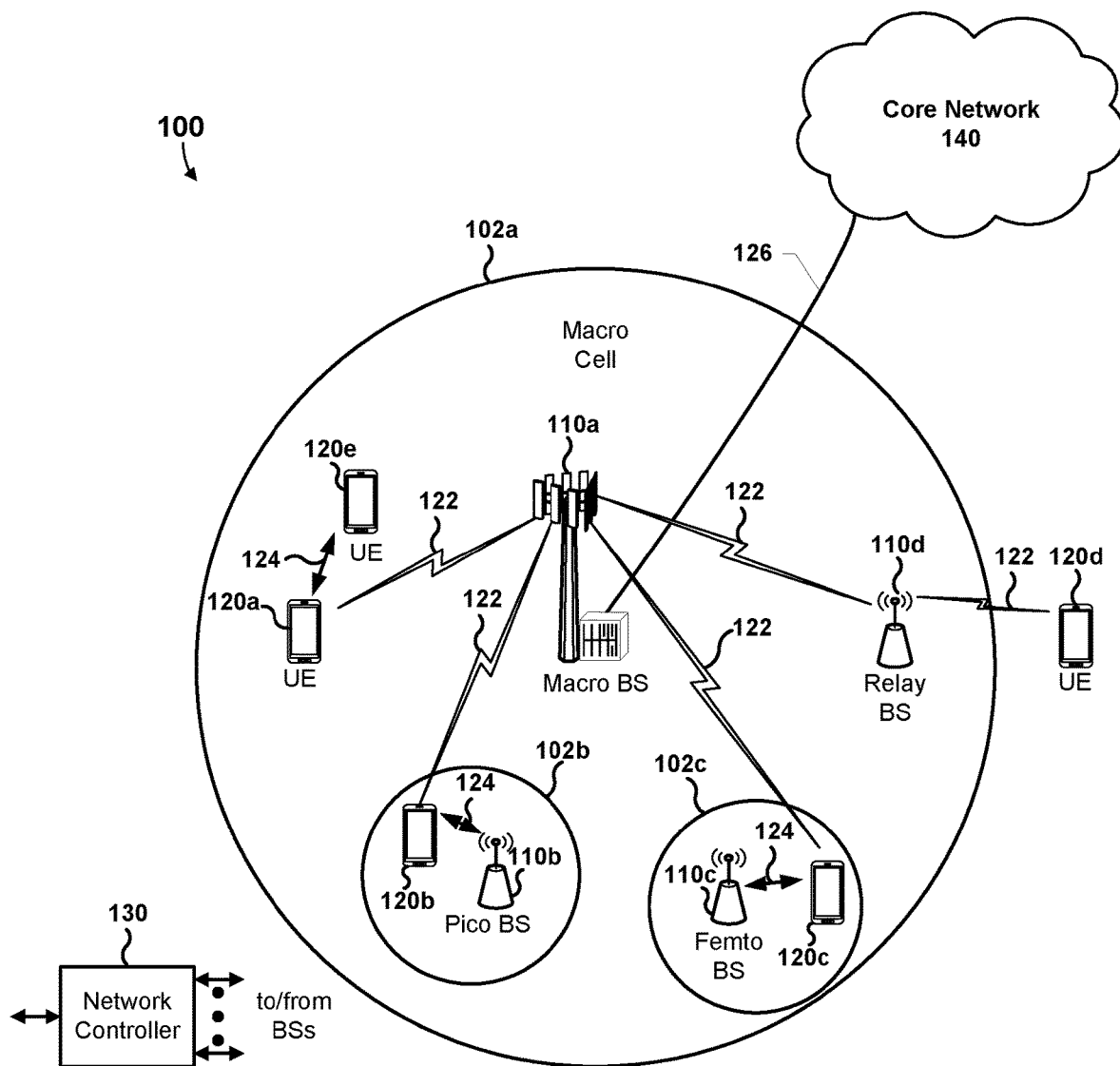
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for managing information transmission for wireless communications between devices such as a base station and a wireless device. Various embodiments may improve the efficiency and accuracy of wireless communications between such devices by providing information to wireless devices that may improve their operations but without revealing information that is secret or proprietary to the network operator. Base stations may pose or use state information, algorithms and other information that could help wireless devices improve their operations or performance. For ease of reference, base station state information, algorithms and other information that could assist wireless devices is referred to generally and collectively herein as "assistance information." However, such assistance information may be proprietary to the network operator, and as a result may not be shared with (i.e., transmitted to) wireless devices. Various embodiments include using a neural network in the base station to turn assistance information into an encoded form that is transmitted to wireless devices. For ease of reference, the encoded form of the assistance information is referred to herein as "encoded assistance information." Wireless devices are not configured with a trained decoder neural network, and therefore cannot recover or discover the proprietary assistance information from received encoded assistance information. While the original assistance information cannot be decoded or discovered, the encoded assistance information may be provided to a processing module of a receiving wireless device, and the processing module may use the encoded assistance information in updating one or more behaviors of the wireless device. In some embodiments, the wireless device may include a different neural network within the processing block that may be configured to discover or learn how to use received encoded assistance information to update one or more behaviors to improve device functionality or communications with the base station. In such embodiments, the different neural network within the processing block is not a decoder portion of an autoencoder neural network used in the base station to encode the assistance information.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

In some wireless devices, for example, in some wireless device modem implementations, increased knowledge of algorithms used by a base station or information about internal states of the base station may enable the wireless device to improve wireless communication performance, efficiency, and accuracy. For example, increased knowledge of algorithms used by, or internal states of, a base station scheduler may enable the wireless device to derive improved channel state feedback. Examples of such information include whether the base station will utilize a sounding reference signal (SRS) in its scheduling, and how; whether the base station will pair the wireless device via multi-user (MU) multiple-input multiple-output (MIMO) at a scheduling time; any scheduling delay at the base station; whether the base station employs an outer loop for scheduling, and if so, what type of algorithm it may use; a beam management algorithm of the base station; and other suitable information or algorithms. However, these algorithms and this information may be too large to be delivered quickly and efficiently to a wireless device. Further, this information may be proprietary or secret information that the owner of the base station, such as a wireless network service provider, does not want to reveal in a form that is easily discoverable by competitors.

Various embodiments include methods that leverage a trained encoder neural network in a base station to transform assistance information (e.g., state information, algorithms, instructions, and other suitable assistance information) into encoded assistance information with a dramatically reduced information density that cannot be used to recover the assistance information without a decoder neural network, which is not shared with wireless devices. Since the wireless device is not configured with a corresponding trained decoder neural network, the wireless device does not decode the encoded assistance information. Rather, the wireless device may receive the encoded assistance information and apply the information to an internal processing block or functionality to use the information to update one or more behaviors of the wireless device without the ability to reproduce the base station assistance information.

In various embodiments, the base station may use unsupervised learning methods to train an encoder neural network using autoencoder processes to learn how to condense the assistance information (i.e., base station algorithms, state conditions and other information, etc.) into encoded assistance information. For example, the base station processor may use unsupervised learning to train an autoencoder neural network to compress an input of the assistance information into encoded assistance information by using a decoder neural network that recovers the information for comparison to the input information. A loss function may be calculated based on a delta between the actual and reconstructed input, and an optimizer function may train both the encoder and the decoder to lower the loss function (i.e., a reconstruction loss). Once trained, the encoder neural network may be used by the base station processor to generate encoded assistance information that is transmitted for wireless device use, while the decoder neural network remains known only to the base station and is not provided to or configured in the wireless device. Thus, the encoded assistance information is received by wireless devices in a form that cannot be used by the device to recover or learn about the assistance information. Nevertheless, the encoded assistance information will have a characteristic determined by or dependent on the assistance information, and thus includes information that receiving wireless devices can learn over time to use for managing or updating one or more behaviors so as to better communicate with the base station.

In some embodiments, the base station may transmit the encoded assistance information to a wireless device via a control channel. The wireless device may be configured with circuitry, algorithms or a neural network (different from the autoencoder neural network used in the base station) to utilize the encoded assistance information, such as to update one or more behaviors of the wireless device. In some embodiments, wireless devices may not be configured initially with algorithms or a trained neural network configured to transform received encoded assistance information, and instead may include a self-learning neural network within a processing block that learns over time how to update one or more behaviors in response to observed particular characteristics or changes in the received encoded assistance information.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120*a*-120*e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some embodiments, two or more mobile devices 120*a*-120*e* (for example, illustrated as the wireless device 120*a* and the wireless device 120*e*) may communicate directly using one or more sidelink channels 124 (for example, without using a base station 110*a*-110*d* as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a.

Figure 2:
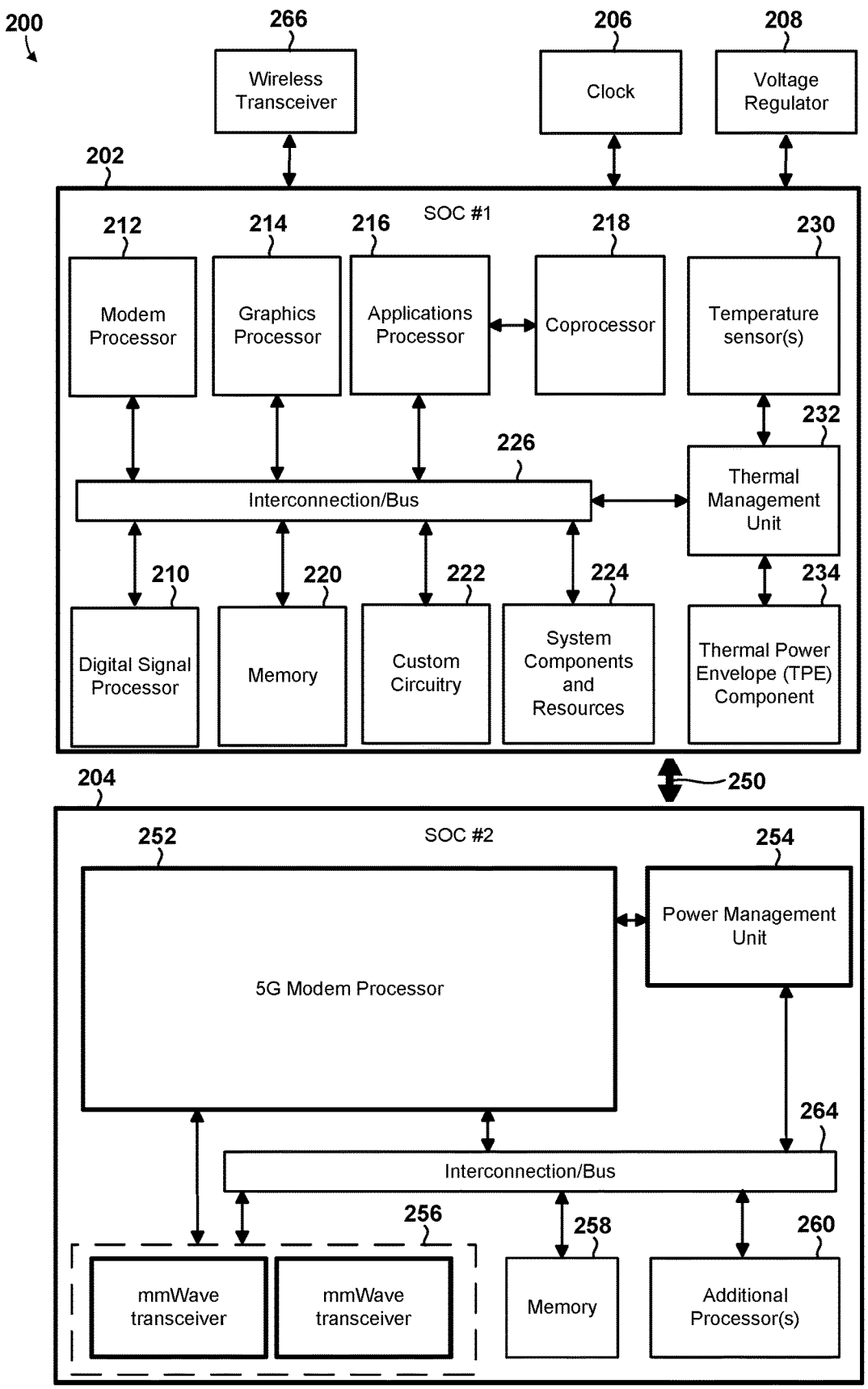
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
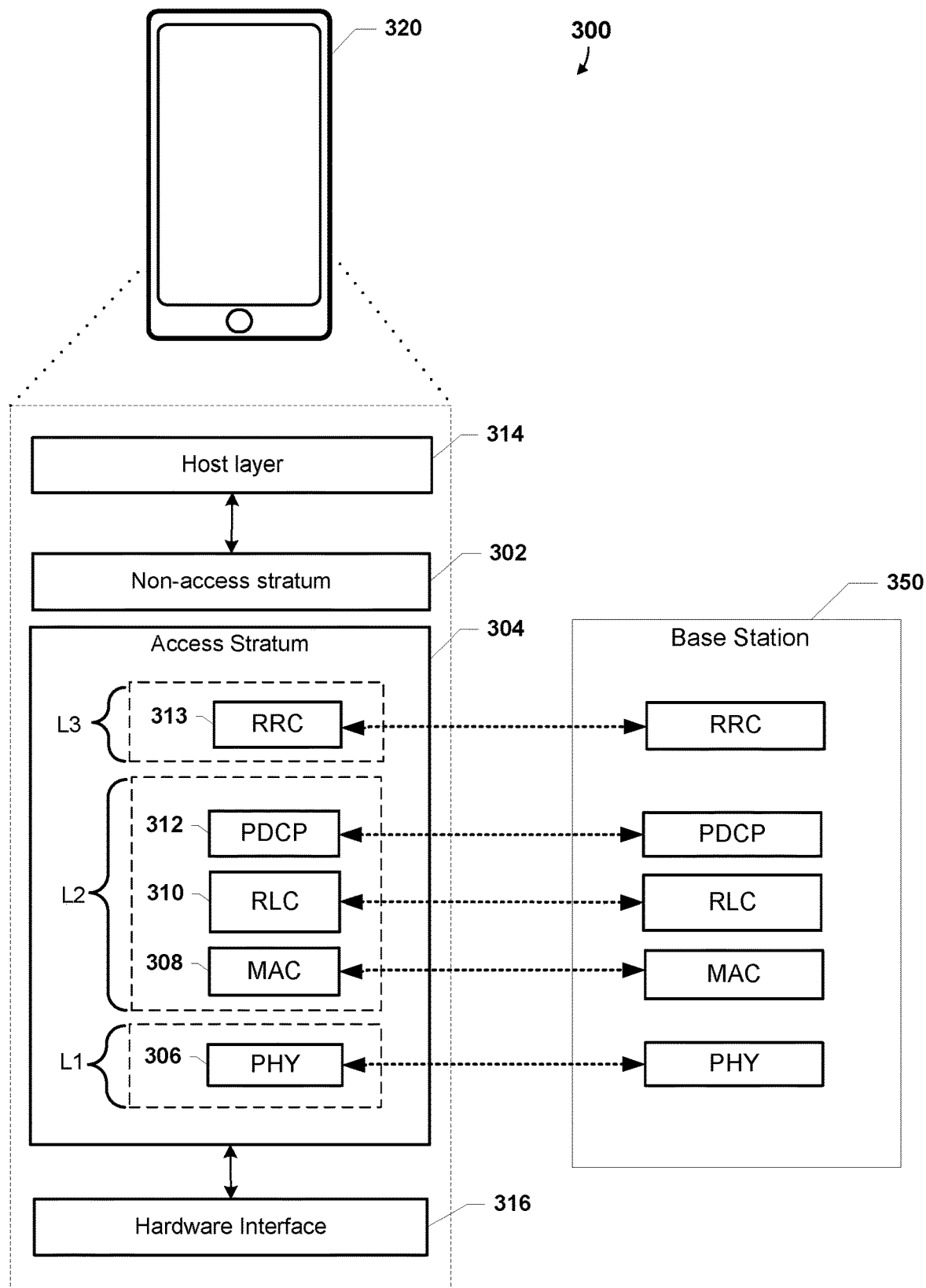
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
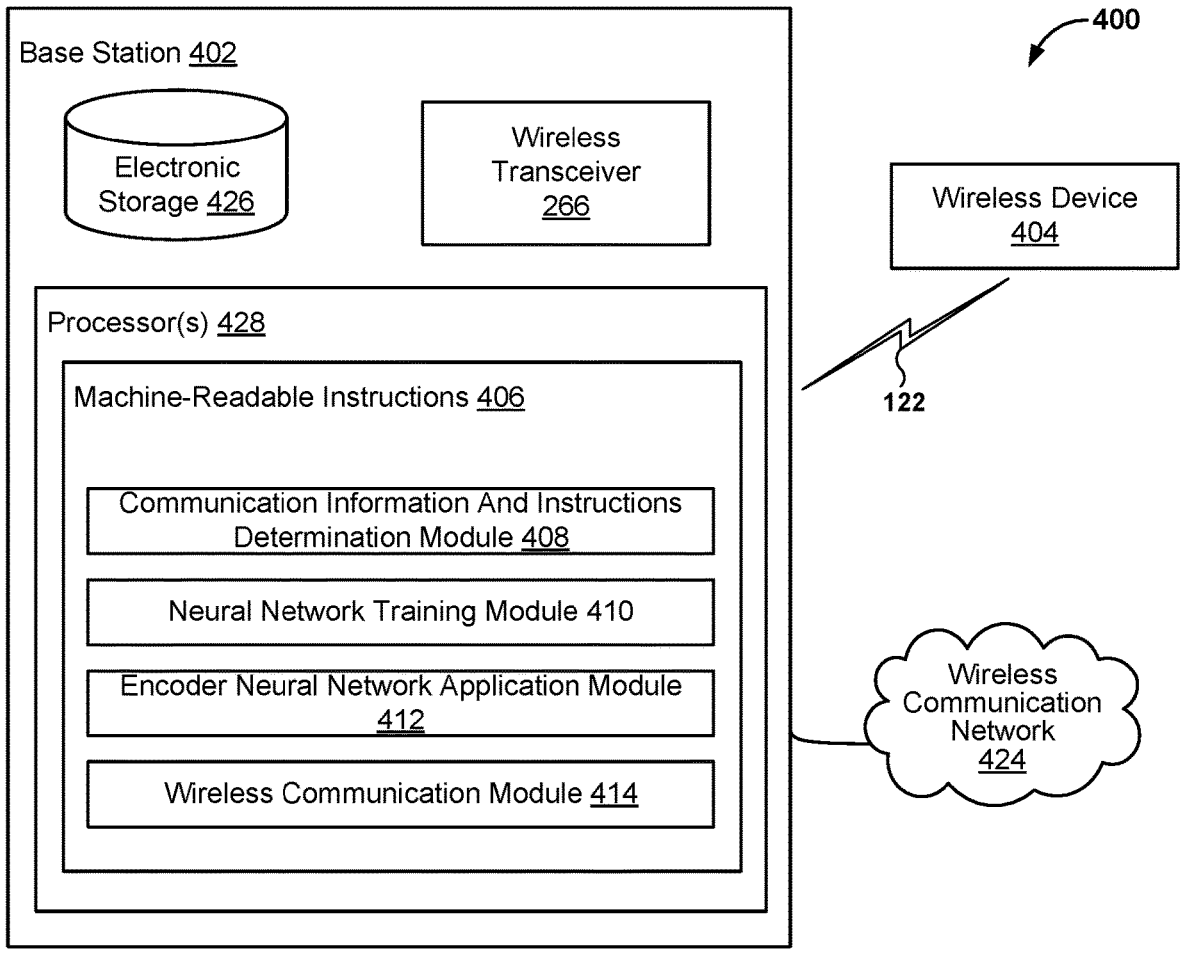
FIGS. 4A and 4B are component block diagrams illustrating a system configured for managing information transmission for wireless communications performed by a processor of a base station in accordance with various embodiments.
Figure 4B:
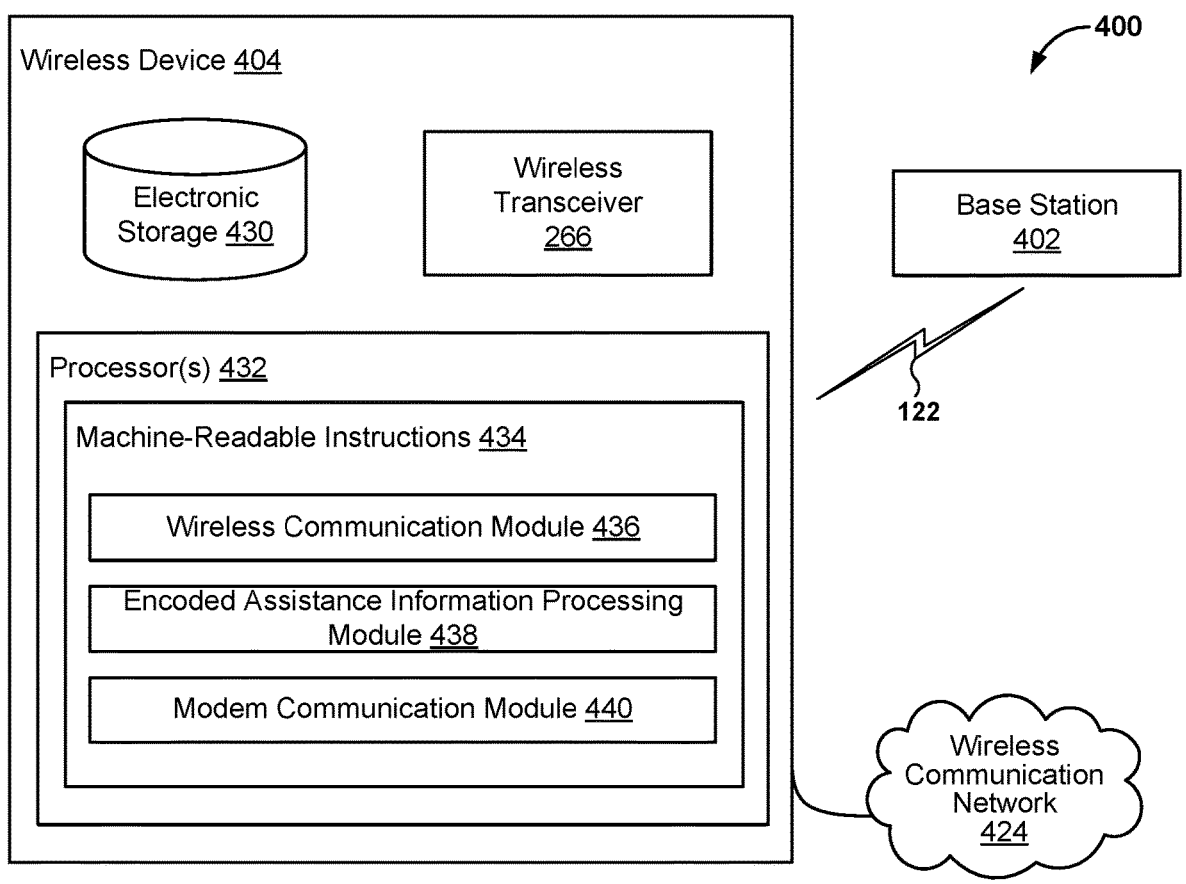

FIGS. 4A and 4B are component block diagrams illustrating a system 400 configured for managing information transmission for wireless communications performed by a processor of a base station in accordance with various embodiments. With reference to FIGS. 1-4B, system 400 may include a base station 402 (e.g., 110a-110d, 200, 350) and a wireless device 404 (e.g., 120a-120e, 200, 320). The base station 402 and the wireless device 404 may communicate over a wireless communication link 122 that may provide the wireless device 404 with access to a wireless communication network 424 (aspects of which are illustrated in FIG. 1).

The base station 402 may include one or more processors 428 coupled to electronic storage 426 and a wireless transceiver (e.g., 266). The wireless transceiver 266 may be configured to receive messages to be sent in downlink transmissions from the processor(s) 428, and to transmit such messages via an antenna (not shown) to the wireless device 404. In some embodiments, the base station 402 may receive message from the wireless communication network 424 for relay to the wireless device 404. Similarly, the wireless transceiver 266 may be configured to receive messages from the wireless device 404 in uplink transmissions and pass the messages (e.g., via a modem (e.g., 252) that demodulates the messages) to the one or more processors 428 for eventual relay to the wireless communication network 424.

The processor(s) 428 may be configured by machine-readable instructions 406. Machine-readable instructions 406 may include one or more instruction modules. The instruction modules may include computer program modules. The instruction modules may include one or more of a communication information and instructions determination module 408, a neural network training module 410, an encoder neural network application module, a wireless communication module 414, or other instruction modules.

The communication information and instructions determination module 408 may be configured to determine base station algorithms, information used by the processor to generate communication information and instructions for wireless devices to enable communications with the base station.

The neural network training module 410 may be configured to train the encoder neural network to compress the base station algorithms, information and corresponding data useful for enabling communications with the base station into encoded assistance information that is processed by a decoder neural network to recover the base station algorithms, information and corresponding data useful for enabling communications with the base station, with differences used to update the encoder neural network using unsupervised learning methods. For training (i.e., in the base station, or in another network device or element), the encoder neural network may be a part of an autoencoder that consists of the encoder neural network and a decoder neural network. The encoder and decoder pair in the autoencoder are trained jointly such that a cost measure or loss function (such as mean-square error) between the input to the encoder and the output from the decoder is minimized. The encoder neural network trained in this manner will transform the base station algorithms or information into an encoded output that a wireless device, which has no access to the decoder neural network, cannot use to reproduce the base station algorithms or information. Nevertheless, the encoded output may be useful for various operations of the wireless device in optimizing the communication performance, reduce complexity, and/or reduce power consumption.

The neural network application module 412 may be configured to apply an encoder neural network to the base station algorithms or information used by the processor to generate encoded assistance information for transmission to the wireless device 404.

The wireless communication module 414 may be configured to transmit the encoded assistance information to the wireless device 404. In some embodiments, the encoded assistance information will be transmitted by the base station over a data channel. In some embodiments, the encoded assistance information will be transmitted by the base station over a control channel.

The wireless device 404 may include one or more processors 432 coupled to an electronic storage 430 and a wireless transceiver (e.g., 266). The wireless transceiver 266 may be configured to receive messages to be sent in uplink transmissions from the processor(s) 432, and to transmit such messages via an antenna (not shown) to the base station 402. Similarly, the wireless transceiver 266 may be configured to receive messages from the base station 402 in downlink transmissions and pass the messages (e.g., via a modem (e.g., 252) that demodulates the messages) to the one or more processors 432.

The processor(s) 432 may be configured by machine-readable instructions 434. Machine-readable instructions 406 may include one or more instruction modules. The instruction modules may include computer program modules. The instruction modules may include one or more of a wireless communication module 436, an encoded assistance information processing module 438, a modem communication module 440, or other instruction modules.

The wireless communication module 436 may be configured to receive from the base station 402 an encoded assistance information of a base station encoder neural network. In some embodiments, the wireless communication module 436 may be configured to receive the encoded assistance information of the base station encoder neural network via a control channel.

The encoded assistance information processing module 438 may be configured to use the received encoded assistance information to update one or more wireless device behaviors. The encoded assistance information processing module 438 is unable to decode (i.e., is not configured to decode) the original assistance information that was input to the base station encoding neural network. In some embodiments, the encoded assistance information processing module 438 may include a self-learning neural network (different from base station neural networks) that may learn over time how to use the encoded assistance information received from the base station for various purposes, such as updating one or more behaviors in a manner that improves wireless device performance.

The modem communication module 440 may be configured to enable communications with the base station 402.

In some embodiments, the base station 402 and wireless device 404 may be operatively linked via one or more electronic communication links (e.g., wireless communication link 122). It will be appreciated that this is not intended to be limiting, and that the scope of this disclosure includes embodiments in which the base station 402 and wireless device 404 may be operatively linked via some other communication media.

The electronic storage 426, 430 may include non-transitory storage media that electronically stores information. The electronic storage media of electronic storage 426, 430 may include one or both of system storage that is provided integrally (i.e., substantially non-removable) with the base station 402 or wireless device 404 and/or removable storage that is removably connectable to the base station 402 or wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 or wireless device 404, or other information that enables the base station 402 or wireless device 404 to function as described herein.

Processor(s) 428, 432 may be configured to provide information processing capabilities in the base station 402. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-440 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-440 described below is for illustrative purposes, and is not intended to be limiting, as any of modules 408-414 and modules 436-440 may provide more or less functionality than is described. For example, one or more of the modules 408-414 and modules 436-440 may be eliminated, and some or all of its functionality may be provided by other modules 408-414 and modules 436-440. As another example, the processor(s) 428, 432 may be configured to execute one or more additional modules that may perform some or all of the functionality attributed below to one of the modules 408-414 and modules 436-440.

Figure 5:
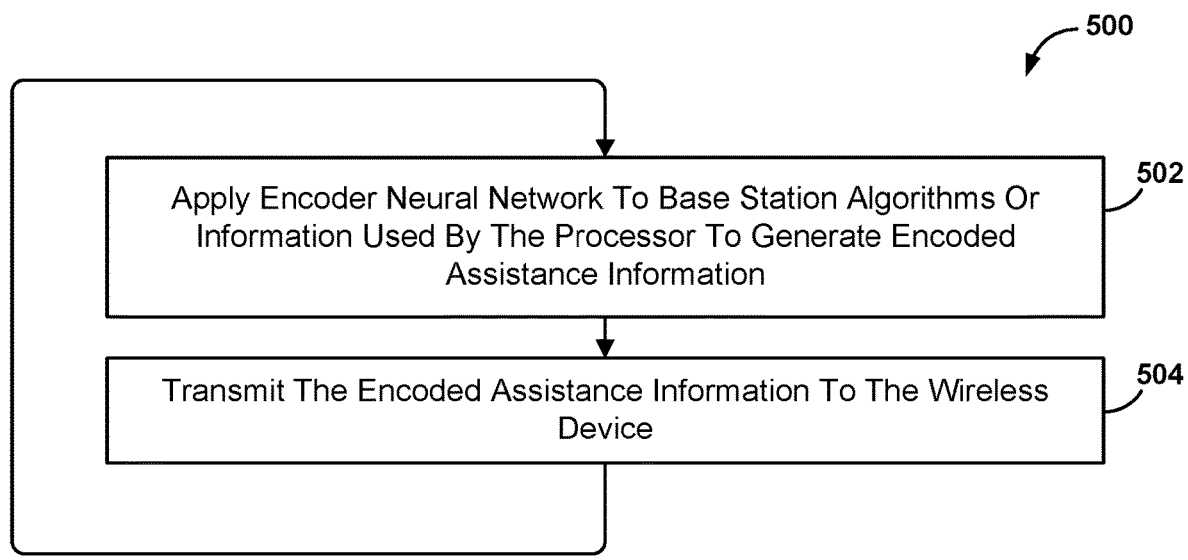
FIG. 5 is a process flow diagram illustrating a method that may be performed by a processor of a base station for managing information transmission for wireless communications in accordance with various embodiments.

FIG. 5 is a process flow diagram illustrating a method 500 that may be performed by a processor of a base station for managing information transmission for wireless communications according to various embodiments. With reference to FIGS. 1-5, the method 500 may be implemented by a processor (e.g., 210, 212, 214, 216, 218, 252, 260, 428) of a base station (e.g., the base station 110a-110d, 350, 402).

In block 502, the processor may apply an encoder neural network to assistance information in the base station to generate encoded assistance information. In some embodiments, the encoder neural network may be trained to transform the assistance information into encoded assistance information that a receiving wireless device can provide to a processing block of the wireless device to update one or more behaviors of the wireless device without reproducing the base station algorithms or information. In some embodiments, the base station algorithms or information include information about an internal state of the base station. Means for performing functions of the operations in block 502 may include the processor (e.g., 210, 212, 214, 216, 218, 252, 260, 428).

In some embodiments, the base station algorithms or information may include, for example, whether the base station will utilize an SRS in its scheduling, and in what manner or way. The base station algorithms or information may include, for example, whether the base station will pair the wireless device via MU-MIMO at a scheduling time. As another example, the base station algorithms or information may include an indication of any scheduling delay at the base station. As another example, the base station algorithms or information may include whether the base station employs an outer loop for scheduling, and if so, what type of algorithm it may use. The base station algorithms or information may include, for example, a beam management algorithm of the base station. The base station algorithms or information may include any other suitable information or algorithms, including any combination of the foregoing.

In some embodiments, a set of base station algorithms or information may be represented as X, and the encoder algorithm may be trained to encode a compact message m (referred to elsewhere herein as encoded assistance information), which may be represented as $m \triangleq f_{enc,\theta}(X)$, in which m is defined by an encoder function $f_{enc,\theta}$ applied to the set of base station algorithms or information X, and θ represents weights of the encoder neural network. In some embodiments, the compact message m includes one or fewer dimensions than the set X. In some embodiments, the reduction in dimensionality in transforming the set of base station algorithms or information X to the compact message m results from a lossy compression performed by the encoder algorithm.

In various embodiments, the encoder algorithm may be trained using unsupervised learning methods by using a decoder neural network to recover X from m and adjusting the weights of the encoder and decoder neural networks based on a difference or error until a highly compressed compact message m is produced that can be decoded with acceptable difference or error. In unsupervised learning of an encoder-decoder pair of neural networks, the encoder neural network and decoder neural network may be trained together. The processor may train the decoder neural network to output data which may be represented as $\hat{X}$, and which may be defined as $\hat{X} \triangleq f_{dec,\phi}(m)$, in which $\hat{X}$ is defined by a decoder function $f_{dec,\phi}$ applied to the compact message m and ϕ represents weights of the decoder neural network. In some embodiments, $\hat{X}$ may be represented as $\hat{X} \triangleq f_{dec,\phi}(m) = f_{dec,\phi}(f_{enc,\theta}(X))$. The processor may determine a loss function for training of the encoder and decoder neural networks. For example, the loss function may be represented as $E(\|\hat{X}-X\|^2)$, which represents a distance or difference between X and $\hat{X}$. The processor may apply the loss function during training of the encoder neural network and the decoder neural network to reduce the distance or difference between X and $\hat{X}$, thereby increasing the amount of information about X included in the compact message m.

In block 504, the processor may transmit the encoded assistance information to the wireless device. In some embodiments, the base station may transmit the encoded assistance information (e.g., m) to the wireless device via a control channel.

In some embodiments, the base station may transmit the encoded assistance information (e.g., m) to the wireless device via a data channel. Means for performing functions of the operations in block 504 may include the processor (e.g., 210, 212, 214, 216, 218, 252, 260, 428) coupled to a wireless transceiver (e.g., 266).

The method 500 may be repeated continuously or periodically as the processor may again perform the operations of block 502.

Figure 6:
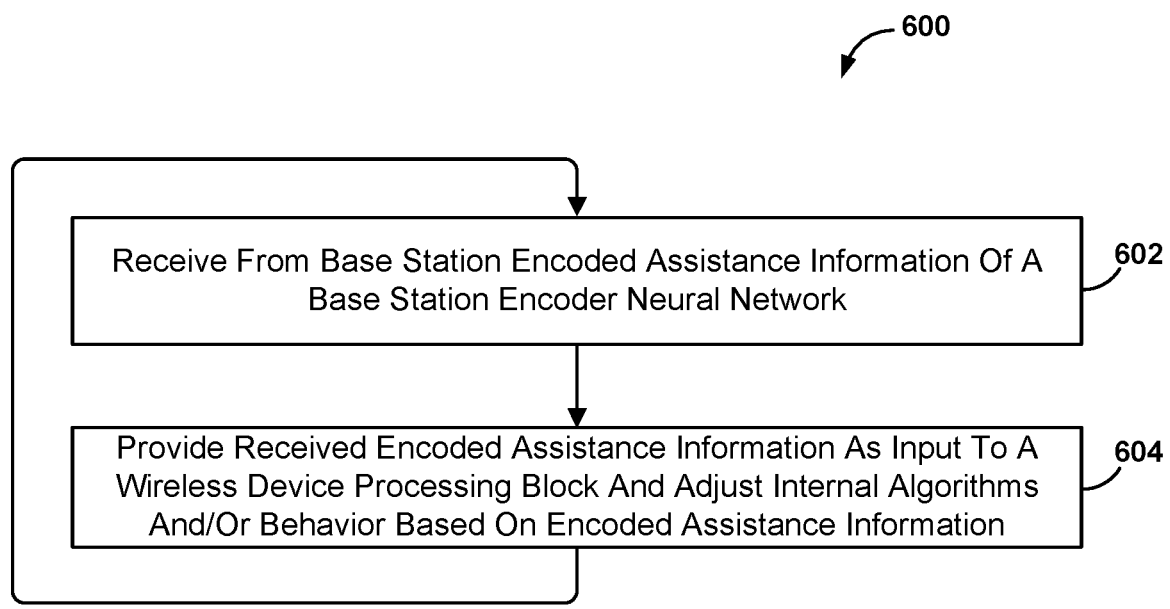
FIG. 6 is a process flow diagram illustrating a method that may be performed by a processor of a wireless device for managing information transmission for wireless communications according to various embodiments.

FIG. 6 is a process flow diagram illustrating a method 600 that may be performed by a processor of a wireless device for managing information transmission for wireless communications according to various embodiments. With reference to FIGS. 1-6, the method 600 may be implemented by a processor (e.g., 210, 212, 214, 216, 218, 252, 260, 432) of a wireless device wireless device (e.g., 120a-120e, 200, 320, 404).

In block 602, the processor may receive from a base station encoded assistance information of a base station encoder neural network. For example, the processor may receive from the base station a compact message m as described. In some embodiments, the processor may receive the encoded assistance information via a control channel. In some embodiments, the processor may receive the encoded assistance information via a data channel. Means for performing functions of the operations in block 602 may include the processor (e.g., 210, 212, 214, 216, 218, 252, 260, 432) coupled to a wireless transceiver (e.g., 266).

In block 604, the processor may provide the received encoded assistance information as an input to a processing block of the wireless device and may update one or more behaviors of the wireless device based on the encoded assistance information. In some embodiments, the processor may provide the encoded assistance information to a modem block of the wireless device. In some embodiments, the modem block may update one or more behaviors based on the encoded assistance information. In some embodiments, the processing block of the wireless device may be configured to use the encoded assistance information without decoding the encoded assistance information, thereby avoiding reproducing base station algorithms or information that were input to the base station encoder neural network. In some embodiments, one or more behaviors of the wireless device may change as a function of the input encoded assistance information. In some embodiments, the processing block may include a self-learning neural network that may learn how to use the received encoded assistance information to improve performance of the wireless device. In some embodiments, the neural network of the processing block may be trained with the encoded assistance information as one of its inputs. In some embodiments, the neural network of the processing block may learn (or may be trained) over time how to use the encoded assistance information to update one or more wireless device behaviors to improve performance of the wireless device, such as improving one or more aspects of communications with the base station. In some embodiments, updating one or more behaviors of the wireless device may include using the encoded assistance information as an input to internal algorithms so that its output becomes a function of the encoded assistance. Means for performing functions of the operations in block 604 may include the processor (e.g., 210, 212, 214, 216, 218, 252, 260, 432) and a modem block or modem processor (e.g., 212, 252).

The method 600 may be repeated continuously or periodically as the processor may again perform the operations of block 602.

Figure 7:
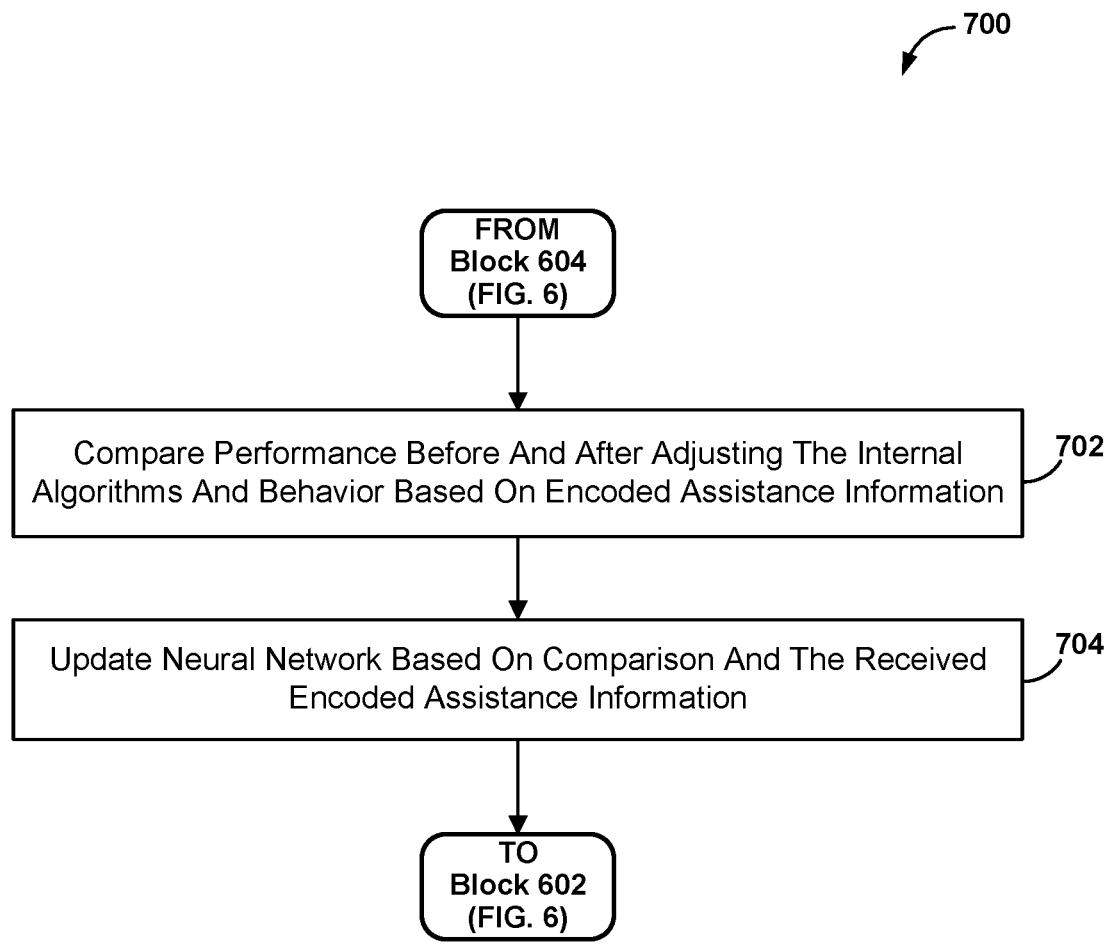
FIG. 7 is a process flow diagram illustrating a method that may be performed by a processor of a wireless device for managing information transmission for wireless communications in accordance with various embodiments.

FIG. 7 is a process flow diagram illustrating a method 700 that may be performed by a processor of a wireless device as part of the method 600 to train a self-learning neural network to learn how to use the received encoded assistance information to improve performance of the wireless device according to some embodiments. With reference to FIGS. 1-7, the method 700 may be implemented by a processor (e.g., 210, 212, 214, 216, 218, 252, 260, 432) of a wireless device wireless device (e.g., 120a-120e, 200, 320, 404).

Following the operations of block 604 (FIG. 6), in block 702, the processor may provide the received encoded assistance information as an input to a processing block of the wireless device, which may update one or more behaviors based on the encoded assistance information. In some embodiments, the processing block may include a neural network that receives the encoded assistance information as one of its inputs. In such embodiments, weights of the neural network may be trained via backpropagating gradients of a loss function with respect to the neural network weights (which may be referred to as supervised learning). In some embodiments, the processing block may include a neural network that does not include a differentiable loss function. In such embodiments, a gradient backpropagation may be used to train the neural network via reinforcement learning techniques.

In case the internal algorithms and/or behavior is not a neural network, the algorithm/behavior may learn how to use the received encoded assistance information in the following trial-and-error manner: the processor may compare a performance of the wireless device before and after updating one or more behaviors of the wireless device in block 604. For example, the processor may evaluate the performance of one or more operations of the wireless device before, and after updating one or more behaviors of the wireless device of the wireless device to determining whether performance of the wireless device has been improved or made worse by the adjustments. As another example, the processor may evaluate the quality of a communication link with the base station before, and after updating one or more behaviors of the wireless device of the wireless device to determining whether the link quality has been improved or made worse by the update. Means for performing functions of the operations in block 702 may include the processor (e.g., 210, 212, 214, 216, 218, 252, 260, 432) and the modem block or modem processor (e.g., 212, 252).

In block 704, the processor may update a neural network in the processing block of the wireless device based on the comparison made in block 702 and the received encoded assistance information. For example, the processor may update (e.g., adjust, alter, etc.) one or more weights of the neural network toward the direction that makes the performance of the wireless device better for the given received encoded assistance information. In case of supervised learning, this is typically accomplished by computing and backpropagating the gradients of the loss function with respect to the neural network weights. By updating weights of the neural network based on such improvement a self-learning neural network in the wireless device may learn over time how to use the received encoded assistance information to improve device performance. In some embodiments, updating the neural network may be performed by unsupervised learning. In some embodiments, updating the neural network may be performed by unsupervised learning or training. Means for performing functions of the operations in block 704 may include the processor (e.g., 210, 212, 214, 216, 218, 252, 260, 432) and the modem block or modem processor (e.g., 212, 252).

The processor may then proceed to perform the operations of block 602 (FIG. 6) as described.

Figure 8:
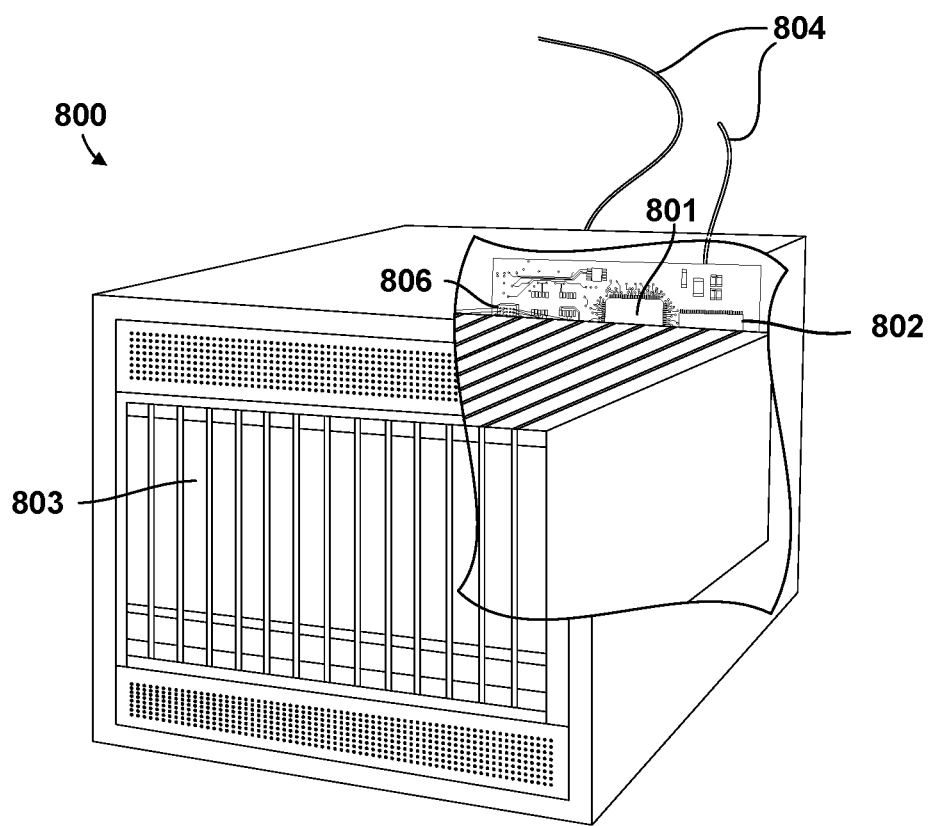
FIG. 8 is a component block diagram of a network computing device suitable for use with various embodiments.

Various embodiments, including the method 500, may be performed in a variety of network computing devices (e.g., in a base station), an example of which is illustrated in FIG. 8 that is a component block diagram of a network computing device 800 suitable for use with various embodiments. Such network computing devices may include at least the components illustrated in FIG. 8. With reference to FIGS. 1-8, a network computing device 800 may include a processor 801 coupled to volatile memory 802 (e.g., 426) and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may be connected to one or more antennas for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
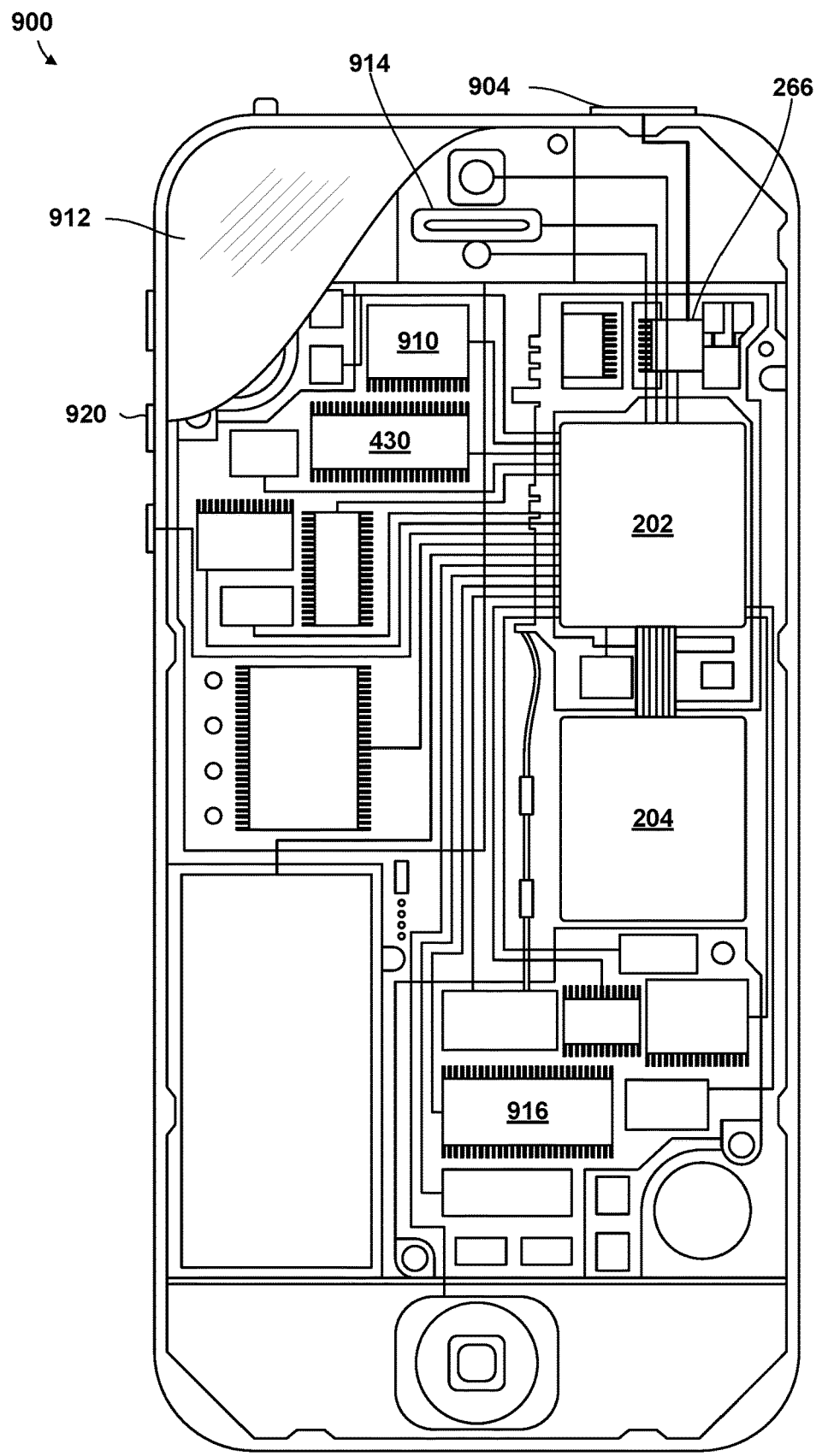
FIG. 9 is a component block diagram of a wireless device suitable for use with various embodiments.

Various embodiments, including the methods 600 and 700, may be performed in a variety of wireless devices (e.g., the wireless device 120a-120e, 200, 320, 402), an example of which is illustrated in FIG. 9 that is a component block diagram of a wireless device 900 suitable for use with various embodiments. With reference to FIGS. 1-9, a wireless device 900 may include a first SOC 202 (e.g., a SOC-CPU) coupled to a second SOC 204 (e.g., a 5G capable SOC). The first and second SOCs 202, 204 may be coupled to internal memory 430, 916, a display 912, and to a speaker 914. Additionally, the wireless device 900 may include an antenna 904 for sending and receiving electromagnetic radiation that may be connected to a wireless data link and/or cellular telephone transceiver 266 coupled to one or more processors in the first and/or second SOCs 202, 204. The wireless device 900 may also include menu selection buttons or rocker switches 920 for receiving user inputs.

The wireless device 900 also may include a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the network computing device 900 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 426, 430, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, and 700 may be substituted for or combined with one or more operations of the methods 500, 600, and 700.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing information transmission for wireless communications performed by a processor of a base station, comprising:
   applying an encoder neural network to assistance information in the base station to generate encoded assistance information; and
   transmitting the encoded assistance information to a wireless device.

2. The method of claim 1, wherein:
   transmitting the encoded assistance information to the wireless device comprises transmitting the encoded assistance information to the wireless device via a control channel or a data channel; and
   the encoded assistance information is in a form that the wireless device cannot process to recover the assistance information in the base station.

3. The method of claim 1, wherein the assistance information in the base station comprises algorithms or information about an internal state of the base station.

4. The method of claim 1, further comprising:
   training the encoder neural network and a decoder neural network on a data set of the assistance information using an unsupervised training method;
   using the trained encoder neural network to generate the encoded assistance information; and
   not sharing the decoder neural network with wireless devices.

5. A computing device for use in a base station of a wireless communication system, comprising:
   a processor configured with processor-executable instructions to perform operations comprising:
      applying an encoder neural network to assistance information in the base station to generate encoded assistance information; and
      transmitting the encoded assistance information to a wireless device.

6. The computing device of claim 5, wherein the processor is further configured with processor-executable instructions to perform operations such that:
   transmitting the encoded assistance information to the wireless device comprises transmitting the encoded assistance information to the wireless device via a control channel or a data channel; and
   the encoded assistance information is in a form that the wireless device cannot process to recover the assistance information in the base station.

7. The computing device of claim 5, wherein the processor is further configured with processor-executable instructions to perform operations such that the assistance information in the base station comprises algorithms or information about an internal state of the base station.

8. The computing device of claim 5, wherein the processor is further configured with processor-executable instructions to perform operations further comprising:
   training the encoder neural network and a decoder neural network on a data set of the assistance information using an unsupervised training method;
   using the trained encoder neural network to generate the encoded assistance information; and
not sharing the decoder neural network with wireless devices.

9. A non-transitory processor readable medium having stored thereon processor-executable instructions configured to cause a computing device in a base station of a wireless communication system to perform operations comprising:
   applying an encoder neural network to assistance information in the base station to generate encoded assistance information; and
   transmitting the encoded assistance information to a wireless device.

10. The non-transitory processor readable medium of claim 9, wherein the stored processor-executable instructions are further configured to cause a computing device in a base station of a wireless communication system to perform operations such that:
   transmitting the encoded assistance information to the wireless device comprises transmitting the encoded assistance information to the wireless device via a control channel or a data channel; and
   the encoded assistance information is in a form that the wireless device cannot process to recover the assistance information in the base station.

11. The non-transitory processor readable medium of claim 9, wherein the stored processor-executable instructions are further configured to cause a computing device in a base station of a wireless communication system to perform operations such that the assistance information in the base station comprises algorithms or information about an internal state of the base station.

12. The non-transitory processor readable medium of claim 9, wherein the stored processor-executable instructions are further configured to cause a computing device in a base station of a wireless communication system to perform operations further comprising:

training the encoder neural network and a decoder neural network on a data set of the assistance information using an unsupervised training method;
using the trained encoder neural network to generate the encoded assistance information; and
not sharing the decoder neural network with wireless devices.

13. A base station for use in a wireless communication system, comprising:
means for applying an encoder neural network to assistance information in the base station to generate encoded assistance information; and
means for transmitting the encoded assistance information to a wireless device.

14. The base station of claim 13, wherein:
means for transmitting the encoded assistance information to the wireless device comprises means for transmitting the encoded assistance information to the wireless device via a control channel or a data channel; and
the encoded assistance information is in a form that the wireless device cannot process to recover the assistance information in the base station.

15. The base station of claim 13, wherein the assistance information in the base station comprises algorithms or information about an internal state of the base station.

16. The base station of claim 13, further comprising:
means for training the encoder neural network and a decoder neural network on a data set of the assistance information using an unsupervised training method; and
means for using the trained encoder neural network to generate the encoded assistance information.

17. A method performed by a processor of a wireless device, comprising:
receiving encoded assistance information from a base station; and
using the encoded assistance information to update one or more behaviors of the wireless device.

18. The method of claim 17, wherein using the encoded assistance information to update one or more behaviors of the wireless device comprises providing the received encoded assistance information as an input to a wireless device processing block and updating one or more behaviors of the wireless device based on the encoded assistance information.

19. The method of claim 17, wherein:
receiving the encoded assistance information comprises receiving the encoded assistance information via a control or a data channel.

20. The method of claim 17, wherein using the encoded assistance information comprises using the encoded assistance information as an input to a self-learning neural network.

21. The method of claim 20, wherein the self-learning neural network is trained via one of supervised learning or reinforcement learning to optimize a cost or performance metric.

22. The method of claim 17, wherein the wireless device is not configured to decode the encoded assistance information.

23. A wireless device, comprising:
a processor configured with processor-executable instructions to perform operations comprising:
receiving encoded assistance information from a base station; and
using the encoded assistance information to update one or more behaviors of the wireless device.

24. The wireless device of claim 23, wherein the processor is further configured with processor-executable instructions to perform operations such that using the encoded assistance information to update one or more behaviors of the wireless device comprises providing the received encoded assistance information as an input to a wireless device processing block and update one or more behaviors of the wireless device based on the encoded assistance information.

25. The wireless device of claim 23, wherein the processor is further configured with processor-executable instructions to perform operations such that:
receiving the encoded assistance information comprises receiving the encoded assistance information via a control or a data channel.

26. The wireless device of claim 23, wherein the processor is further configured with processor-executable instructions to perform operations such that using the encoded assistance information comprises using the encoded assistance information as an input to a self-learning neural network.

27. The wireless device of claim 26, wherein the processor is further configured with processor-executable instructions to perform operations such that the self-learning neural network is trained via one of supervised learning or reinforcement learning to optimize a cost or performance metric.

28. The wireless device of claim 23, wherein the wireless device is not configured to decode the encoded assistance information.

29. A non-transitory processor-readable medium having stored thereon processor-executable instructions configured to cause a processor of a wireless device to perform operations comprising:
receiving encoded assistance information from a base station; and
using the encoded assistance information to update one or more behaviors of the wireless device.

30. The non-transitory processor-readable medium of claim 29, wherein the stored processor-executable instructions are further configured to cause a processor of a wireless device to perform operations such that using the encoded assistance information to update one or more behaviors of the wireless device comprises providing the received encoded assistance information as an input to a wireless device processing block and update one or more behaviors of the wireless device based on the encoded assistance information.

31. The non-transitory processor-readable medium of claim 29, wherein the stored processor-executable instructions are further configured to cause a processor of a wireless device to perform operations such that:
receiving the encoded assistance information comprises receiving the encoded assistance information via a control or a data channel.

32. The non-transitory processor-readable medium of claim 29, wherein the stored processor-executable instructions are further configured to cause a processor of a wireless device to perform operations such that using the encoded assistance information comprises using the encoded assistance information as an input to a self-learning neural network.

33. The non-transitory processor-readable medium of claim 32, wherein the stored processor-executable instructions are further configured to cause a processor of a wireless device to perform operations such that the self-learning neural network is trained via one of supervised learning or reinforcement learning to optimize a cost or performance metric.

34. A wireless device, comprising:
    means for receiving encoded assistance information from a base station; and
    means for using the encoded assistance information to update one or more behaviors of the wireless device.

35. The wireless device of claim 34, wherein means for using the encoded assistance information to update one or more behaviors of the wireless device comprises means for providing the received encoded assistance information as an input to a wireless device processing block and update one or more behaviors of the wireless device based on the encoded assistance information.

36. The wireless device of claim 34, wherein means for receiving the encoded assistance information comprises means for receiving the encoded assistance information via a control or a data channel.

37. The wireless device of claim 34, wherein means for using the encoded assistance information comprises means for using the encoded assistance information as an input to a self-learning neural network.

38. The wireless device of claim 37, wherein the self-learning neural network is trained via one of supervised learning or reinforcement learning to optimize a cost or performance metric.

39. The wireless device of claim 34, wherein the wireless device is not configured to decode the encoded assistance information.

* * * * *